United States Patent [19]

Baumgartner et al.

[11] Patent Number: 5,481,801
[45] Date of Patent: Jan. 9, 1996

[54] PROCESS FOR MANUFACTURING A BEARING SEAT FOR A HALF-SHELL BEARING

[75] Inventors: Hans Baumgartner, Moosburg; Dieter Bieker, Munich, both of Germany

[73] Assignee: Knorr-Bremse AG, Munich, Germany

[21] Appl. No.: 281,021

[22] Filed: Jul. 27, 1994

[30] Foreign Application Priority Data

Nov. 4, 1993 [DE] Germany ................... 4337666

[51] Int. Cl.$^6$ ........................... B23P 15/00
[52] U.S. Cl. ................. 29/898.06; 29/898.13
[58] Field of Search ............. 29/898.13, 898.12, 29/898.06

[56] References Cited

U.S. PATENT DOCUMENTS

| | | |
|---|---|---|
| 1,950,094 | 3/1934 | Stockfleth et al. . |
| 2,086,841 | 7/1937 | Bagley et al. . |
| 2,373,871 | 4/1945 | Conner et al. ................. 29/898.13 |
| 2,689,380 | 9/1954 | Tait ............................... 29/898.13 |
| 3,445148 | 8/1967 | Harris et al. . |
| 3,562,884 | 2/1971 | Webbere ....................... 29/898.13 |
| 5,195,244 | 3/1993 | Green ........................... 29/898.13 |

FOREIGN PATENT DOCUMENTS

| | | |
|---|---|---|
| 0730359 | 3/1966 | Canada ......................... 29/848.13 |
| 3230232 | 2/1984 | Germany . |
| 4106148 | 9/1992 | Germany . |
| 0907791 | 10/1962 | United Kingdom ........... 29/848.13 |

Primary Examiner—Irene Cuda
Attorney, Agent, or Firm—Barnes & Thornburg

[57] ABSTRACT

A process for the manufacturing of a bearing seat for a half-shell bearing in a metal part, in which the metal part is produced by a forging or casting operation with the simultaneous construction of a half-shell-shaped recess whose diameter is slightly smaller than that of the half-shell bearing. Then the recess is machined by a non-cutting process until the diameter of the recess corresponds to that of the half-shell bearing. This process is distinguished by very low costs and can also be used in limited space conditions.

6 Claims, 2 Drawing Sheets

PROCESS FOR MANUFACTURING A BEARING SEAT FOR A HALF-SHELL BEARING

BACKGROUND AND SUMMARY OF THE INVENTION

The present invention relates to a process for manufacturing a bearing seat for a half-shell bearing provided in a metal part. A preferred, although not exclusive, use of the process according to the invention, is the manufacturing of a bearing seat for a half-shell bearing arranged in the application device of a disk brake.

In a known process of this type, a bore is formed in the metal part in which the bearing seat is to be manufactured, first by boring or turning along the axis of the bearing seat. The diameter of this bore corresponds approximately to that of the bearing seat. Then the metal part is worked by a milling tool or by a saw in such a manner that the desired bearing seat is exposed as one half of the bore. This known process requires comparatively high expenditures and, furthermore, has the disadvantage that, because of the bore, at least one of the two axial faces of the bearing seat is open. This is undesirable in many cases. Thus, for example, when the bearing seat for a half-shell bearing is used in the application device of a disk brake, the bearing is arranged in the rearward housing portion. An additional sealing for the bore hole has to be provided in order to ensure the tightness of the housing.

In the case of another known process, the bearing seat for the half-shell bearing is produced directly by milling or grinding. In this case, it is possible to keep both axial faces of the bearing seat closed. However, this process requires comparatively high-expenditure processing steps and therefore increases the manufacturing costs considerably. In many cases, this process cannot be used because the space is not sufficient in the housing portion of an application device, for a stable accommodation of the milling or grinding tool.

It is an object of the invention to provide a manufacturing process which is distinguished by low costs and can be carried out without any problems even in narrow spaces.

According to the invention, this object is achieved by the following process steps. The bearing seat is formed in and at the same time of the manufacture of concerned metal part by a forging or casting operation. A half-shell-shaped recess is formed whose diameter is slightly smaller than that of the half-shell bearing. Subsequently, the recess is subjected machined by a non-cutting process until the diameter of the recess corresponds to that of the half-shell bearing. The non-cutting forming provided according to the invention requires few expenditures and can therefore be carried out at very low cost. Also, limited space conditions present no problem. Finally, the process according to the invention is also distinguished in that the axial face walls of the bearing seat are not necessarily exposed by a machining process to form the seat as in the prior art. A subsequent lateral sealing of the corresponding metal part is therefore not required.

Surprisingly, it was found that, it is particularly advantageous to provide the surface of the recess with a non-planar profile during the forging or casting operation. In this case, the subsequent non-cutting forming can be carried out at particularly low force. Any damage to the metal as a result of the non-cutting forming is therefore impossible. A further advantage of such a profile is that the precise final dimensions of the bearing seat may be controlled, if required, by the respective shape of the profile, while the operating parameters of the non-cutting forming remain uniform or constant. In addition, it is possible to control the achievable surface quality by dimensioning the depth and/or by the shape of the profile.

The mentioned profile may be constructed, for example, in the form of trapezoid, saw-tooth-shaped or wavy ribs. These may be arranged, for example, in parallel or transversely to the longitudinal axis of the recess. As an alternative, it is also possible to construct the profile in the form of essentially uniformly distributed projections or indentations. If the concerned metal part is produced by a casting operation, the respective profile may be manufactured in a particularly simple manner and almost without any additional machining costs by a corresponding construction of the negative profile in the casting mold.

It was found that the non-cutting forming of the recess according to the invention can take place in a particularly low-cost and comparatively fast manner by stamping or striking. Although no great precision can be achieved by this forming process, it will be sufficient in many cases. However, when a higher precision is required, the forming may be carried out by a so-called "roller burnishing", in which the surface is smoothed out by a roller. It may also be possible to first carry out a rough machining by stamping or striking and then carry out a finishing by roller burnishing until a desired manufacturing tolerance is achieved.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1A:
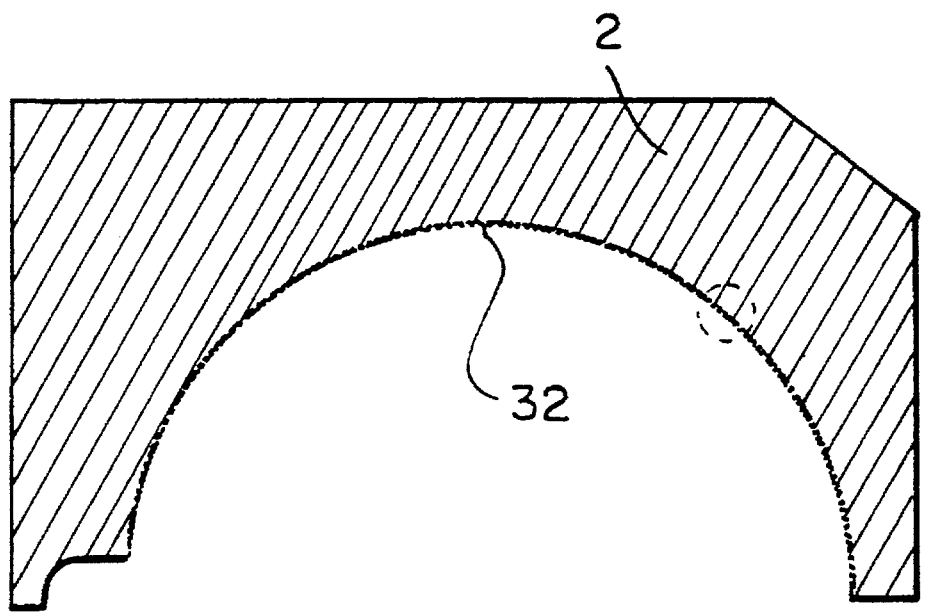
FIG. 1A is a view of the course of a bearing seat embodiment in the form of a schematic cross-sectional view of a metal part.
Figure 1B:
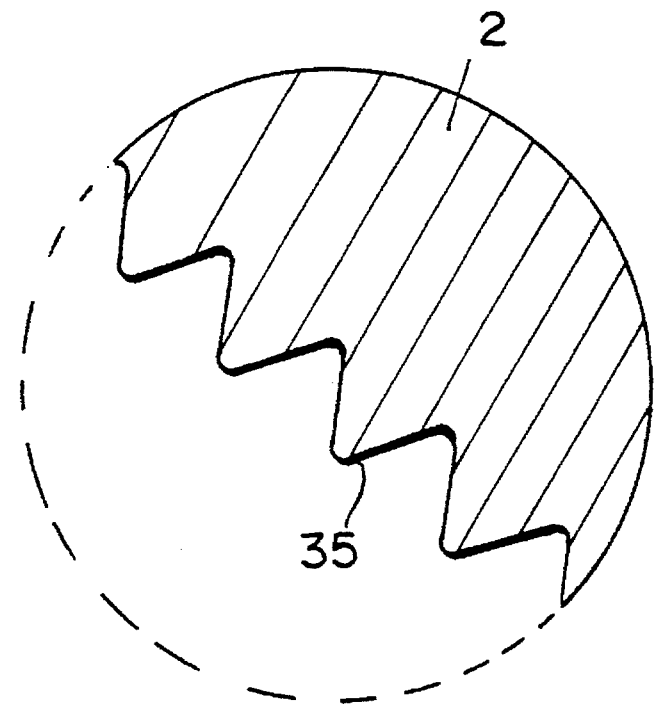
FIG. 1B is an enlarged section of FIG. 1A.

FIGS. 1A and 1B illustrate a metal part 2 in which a bearing seat 32 was formed according to the material of the invention. For this purpose, a blank of the metal part is first manufactured by a forging or casting operation and a recess is simultaneously formed in the blank whose diameter is slightly smaller than that of the half-shell bearing which is provided for accommodating the bearing seat.

As illustrated particularly in the enlargement of the detail of FIG. 1B, the surface of the recess 32 is provided with a non-planar profile 35 which, in the illustrated embodiment, is formed by ribs with a trapezoid course in the manner of an internal toothing which is arranged in the axial direction of the bearing seat or of the recess 32. However, as an alternative, it is possible to provide a different profile, such as a nub-shaped, projections, saw-toothed or wave shaped profile.

When the metal part 2 is manufactured by means of a casting operation, the profile 35 is produced by a corresponding development of a negative profile in the casting mold (which is not shown). However, the development of the desired profile also presents no problem when a forging operation is used for producing the blank.

The surface of the recess 32 of the blank 2 produced in the above-mentioned manner is then subjected to a non-cutting forming by stamping, striking or roller-burnishing. The result or profile 35 is virtually planed and a comparatively smooth bearing surface is obtained whose diameter corresponds to the outside diameter of the half-shell bearing. The achievable surface quality and the precise dimensions of the bearing seat can be precisely controlled, on the one hand, by the type and method of the implementation of the non-cutting forming and, on the other hand, by the depth and the shape of the respective profile. Thus, despite the low process costs, a good accuracy of the fit with low tolerance values can be achieved.

Figure 2:
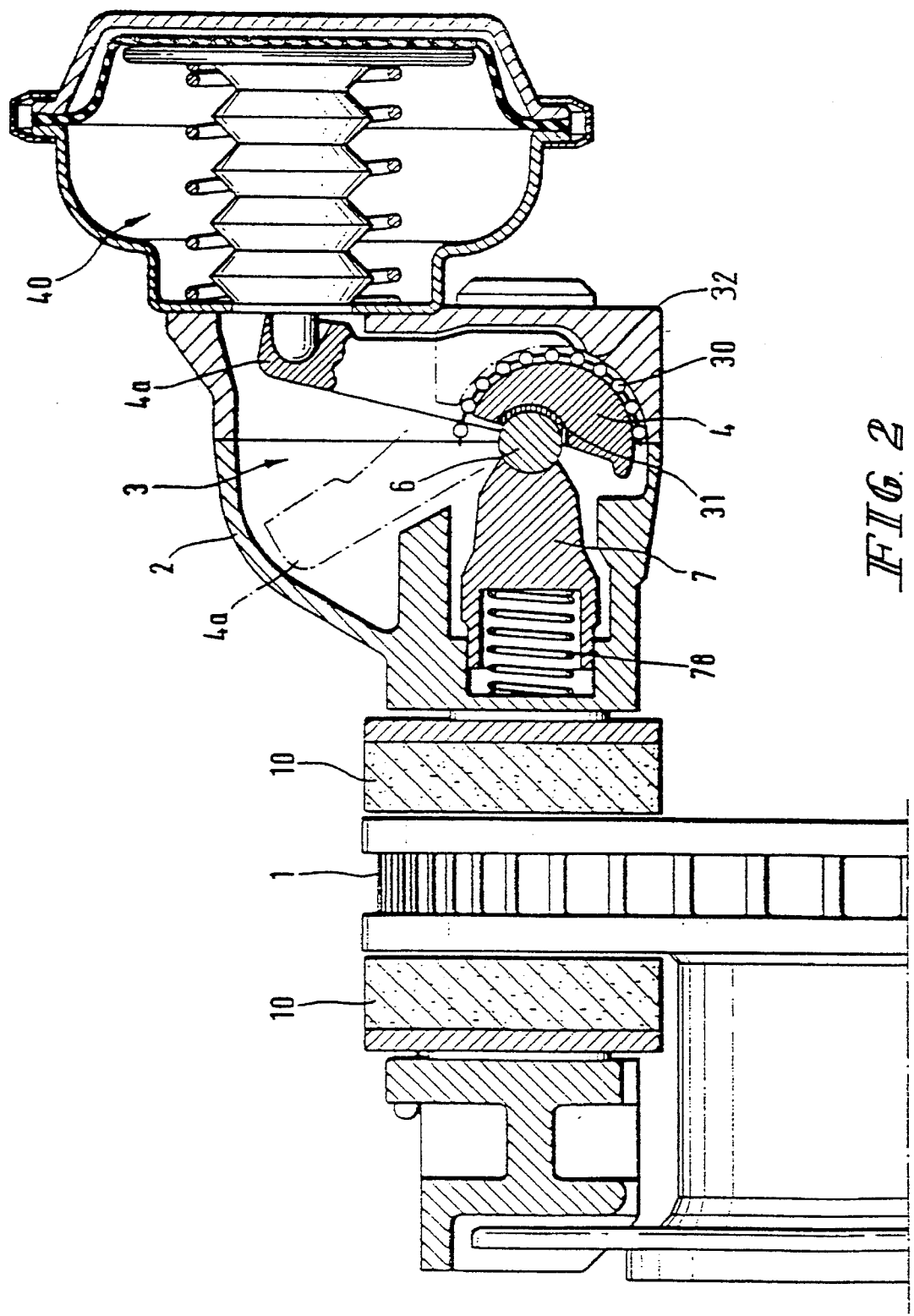
FIG. 2 is a view of an application device of a disk brake in which the bearing seat of a rotary lever is manufactured according to the teaching of the invention.

FIG. 2 illustrates an application device 3 of a disk brake whose essential constructional element is a rotary lever 4 which, facing away from the brake disk, is disposed in a half-shell bearing 30 in the form of a roller bearing whose bearing seat 32 is constructed in the rearward portion of a housing 2 of the application device 3. For actuating the rotary lever 4, a brake cylinder 40 is provided which is illustrated only schematically and which includes a piston rod received in an appropriately shaped recess of an actuating arm 4a of the rotary lever 4. When the brake cylinder 40 is acted upon by compressed air, the actuating arm 4a of the rotary lever 4 is therefore moved from its inoperative position shown in FIG. 2 into the position indicated by an interrupted line in FIG. 2. The two brake shoes 10 are pressed in the direction of the surface of a brake disk 1. The side of the rotary lever 4 which faces away from the half-shell bearing 30 is coupled by an eccentric 6 serving as a cam with a traverse element 7 which extends in parallel to the axis of rotation of the brake disk 1 and is disposed in this plane in a displaceable manner. On its end facing the brake disk 1, the traverse element 7 has a blind-hole-type recess which is surrounded by a tube-type projection which projects in the direction of the brake disk 1. This projection of the traverse element 7 is disposed in a recess in the housing 2 and in which a coil spring 78 is arranged which prestresses the traverse element 7 in the direction of the rotary lever 4.

A perfect operation of the above-explained application device will be ensured only if the housing 2 is largely air tight and therefore prevents moisture or dirt from the interior. Because of the limited space conditions, the bearing seat 32 of the half-shell bearing 30 cannot be produced by milling. Thus, in the prior art process, a bore is first formed in the area of the bearing seat. A cover or another closing element therefore had to be provided to cover the axial face of this bore.

In contrast, when the process according to the invention is used for the manufacturing of the bearing seat 32, no undesirable opening is created in the housing 2 so that the additional costs for the cover are eliminated. Since, in addition, the process according to the invention is less expensive to implement than the known processes, a noticeable reduction of the manufacturing costs of the application device 3 is achieved on the whole.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A process for manufacturing a bearing seat for a half-shell bearing in a metal part, comprising:
    (a) manufacturing a unitary structure having the metal part with a half-shell shaped recess therein whose diameter is slightly smaller than that of the half-shell bearing by a single forging or casting operation; and
    (b) machining by a non-cutting process the recess until the diameter of the recess corresponds to that of the half-shell bearing.

2. A process according to claim 1, wherein the surface of the recess is formed with a non-planar profile during the forging or casting operation.

3. A process according to claim 2, wherein the profile is formed in the surface of the recess in the form of ribs which extend in a trapezoid, saw-toothed or wave shape.

4. A process according to claim 2, wherein the profile is formed in the surface of the recess in the form of essentially uniformly distributed projections or nubs.

5. A process according to claim 1, wherein the non-cutting forming of the recess includes one of stamping, striking or roller-burnishing steps.

6. A process according to claim 1, wherein the manufacturing step of the metal part forms the bearing seat for a half-shell bearing in the application device of a disk brake.

\* \* \* \* \*